(12) United States Patent
Backhaus et al.

(10) Patent No.: US 10,703,054 B2
(45) Date of Patent: Jul. 7, 2020

(54) SHAPING TOOL, SHAPING APPARATUS AND METHOD OF FORMING A SEMI-FINISHED PRODUCT CONTAINING REINFORCING FIBERS

(71) Applicant: Airbus Operations GmbH, Hamburg (DE)

(72) Inventors: Sascha Backhaus, Hamburg (DE); Krzysztof Lenartowicz, Stade (DE); Robert Gaitzsch, Leipzig (DE); Christian Fuerste, Halberstadt (DE)

(73) Assignee: Airbus Operations GmbH, Hamburg (DE)

(*) Notice: Subject to any disclaimer, the term of this patent is extended or adjusted under 35 U.S.C. 154(b) by 494 days.

(21) Appl. No.: 15/184,606

(22) Filed: Jun. 16, 2016

(65) Prior Publication Data
US 2016/0368230 A1    Dec. 22, 2016

Related U.S. Application Data

(63) Continuation of application No. PCT/EP2014/078139, filed on Dec. 17, 2014.

(30) Foreign Application Priority Data

Dec. 19, 2013 (DE) .................. 10 2013 226 739

(51) Int. Cl.
*B29C 70/50* (2006.01)
*B29D 99/00* (2010.01)
(Continued)

(52) U.S. Cl.
CPC ............ *B29C 70/504* (2013.01); *B29C 33/02* (2013.01); *B29C 33/40* (2013.01); *B29C 33/405* (2013.01);
(Continued)

(58) Field of Classification Search
None
See application file for complete search history.

(56) References Cited

U.S. PATENT DOCUMENTS 3,873,399 A   3/1975 Goldsworthy et al.
3,987,542 A * 10/1976 Visco ................ B26B 13/12
30/233
(Continued)

FOREIGN PATENT DOCUMENTS

CN      100418850       1/2007
CN      102933379       2/2013
(Continued)

OTHER PUBLICATIONS

German Search Report, dated Nov. 10, 2014, priority document.
(Continued)

*Primary Examiner* — Nathan T Leong
(74) *Attorney, Agent, or Firm* — Greer, Burns & Crain Ltd.

(57) ABSTRACT

A shaping tool for forming a semi-finished product which contains reinforcing fibers and is fed to the shaping tool in a continuous process comprises a first shaping-tool element and a second shaping-tool element which is located opposite the first shaping-tool element. The shaping-tool elements have shaping faces which face towards the semi-finished product, at least in certain operating phases of the shaping tool, and which are curved and/or inclined, at least in certain sections, in a direction of conveyance of the semi-finished product through the shaping tool, and/or curved and/or inclined, at least in certain sections, in a direction perpendicular to the direction of conveyance of the semi-finished product.

19 Claims, 6 Drawing Sheets

(51) Int. Cl.
  *B29C 33/40* (2006.01)
  *B29C 33/02* (2006.01)
  *B29L 31/30* (2006.01)
  *B29B 15/12* (2006.01)
  *B29K 63/00* (2006.01)
  *B29K 105/06* (2006.01)
(52) U.S. Cl.
  CPC .......... *B29C 70/50* (2013.01); *B29D 99/0003*
    (2013.01); *B29B 15/122* (2013.01); *B29K*
    *2063/00* (2013.01); *B29K 2105/06* (2013.01);
    *B29K 2821/00* (2013.01); *B29L 2031/3076*
    (2013.01)

(56) References Cited

U.S. PATENT DOCUMENTS

| 5,102,609 A | 4/1992 | Miller et al. |
| 2007/0023572 A1 | 2/2007 | Muller et al. |
| 2007/0175575 A1 | 8/2007 | Rubin et al. |
| 2008/0145634 A1 | 6/2008 | Hillermeier et al. |
| 2010/0059169 A1 | 3/2010 | Lengsfeld et al. |
| 2010/0116012 A1 | 5/2010 | Hermes et al. |
| 2013/0142997 A1* | 6/2013 | Hofmann ............... B29C 70/504 428/156 |

FOREIGN PATENT DOCUMENTS

| EP | 0123225 | 10/1984 |
| EP | 1819503 | 8/2007 |
| JE | 102004001078 | 7/2005 |
| JE | 102007062111 | 7/2009 |

OTHER PUBLICATIONS

International Search Report, dated Mar. 8, 2015, Priority Document.
Chinese Office Action, dated Mar. 2, 2017 priority document.

* cited by examiner

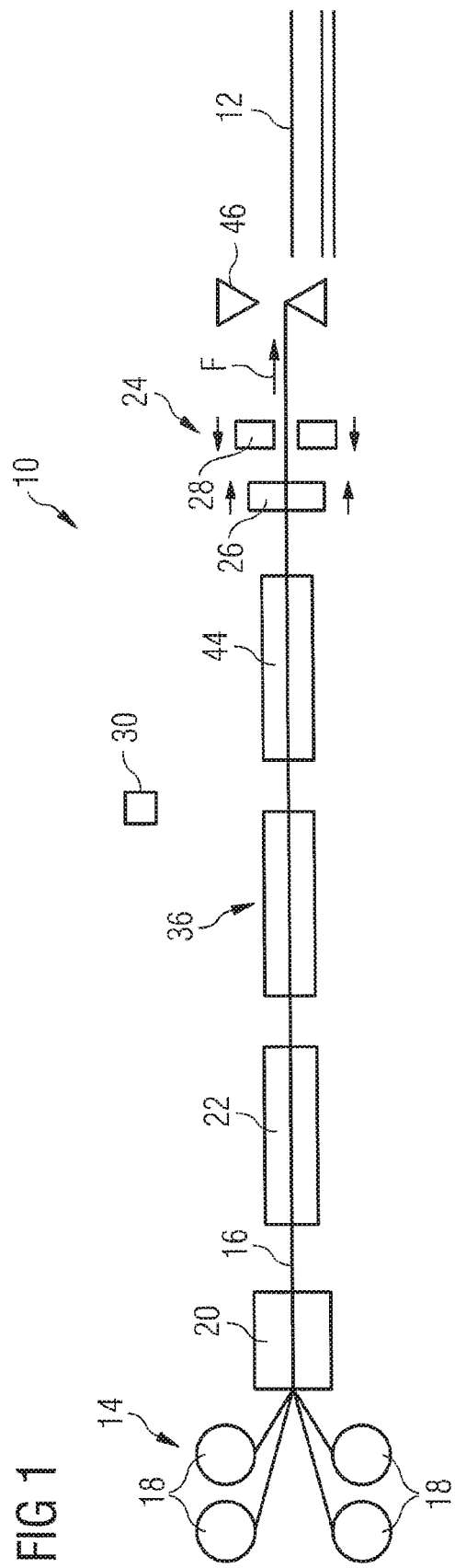

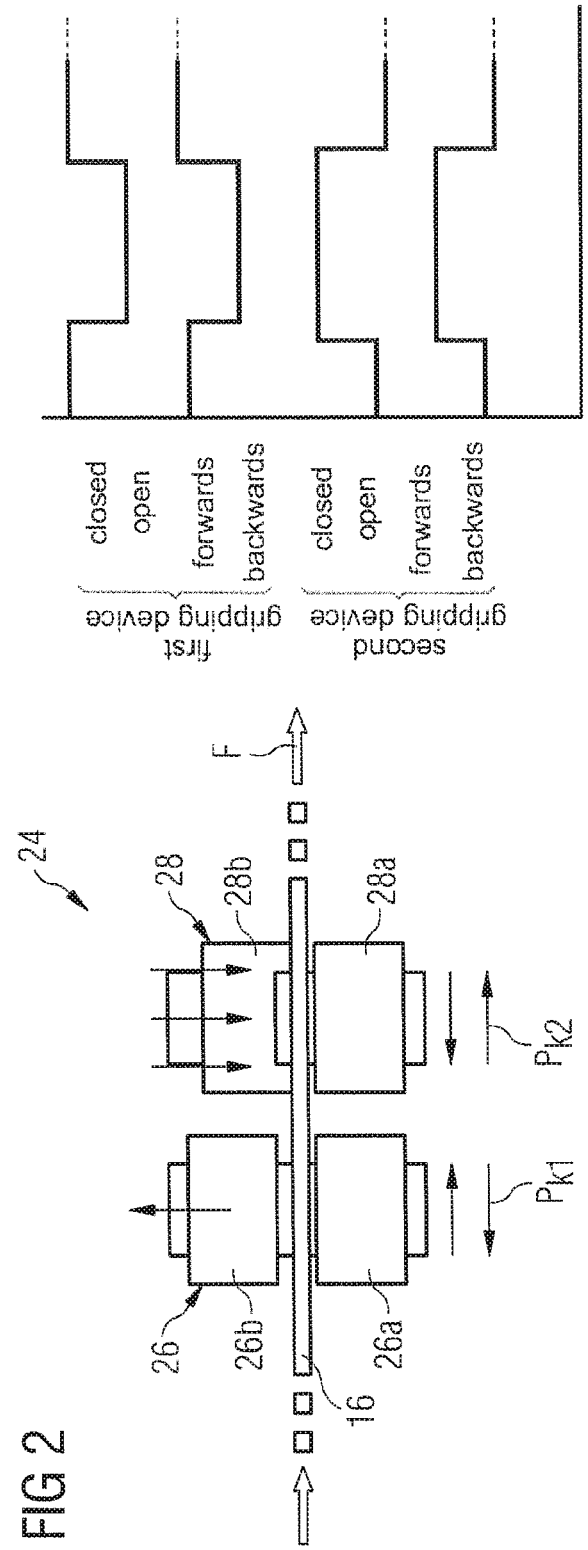

FIG 3A
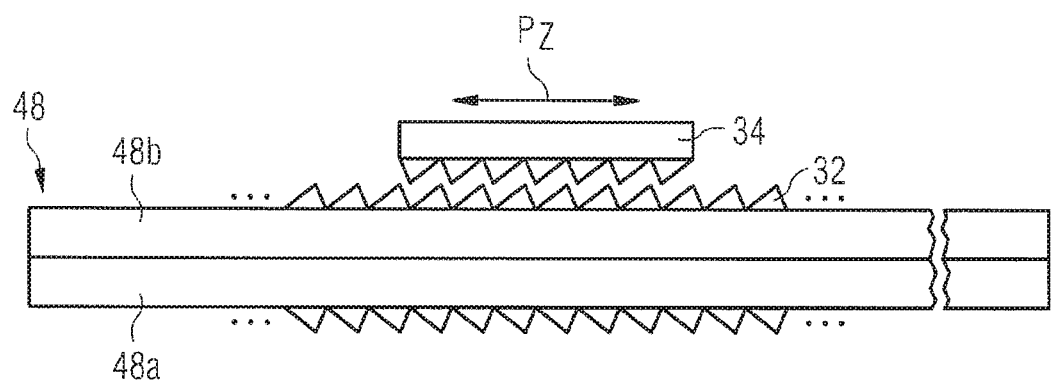
FIG 3B
FIG 3C
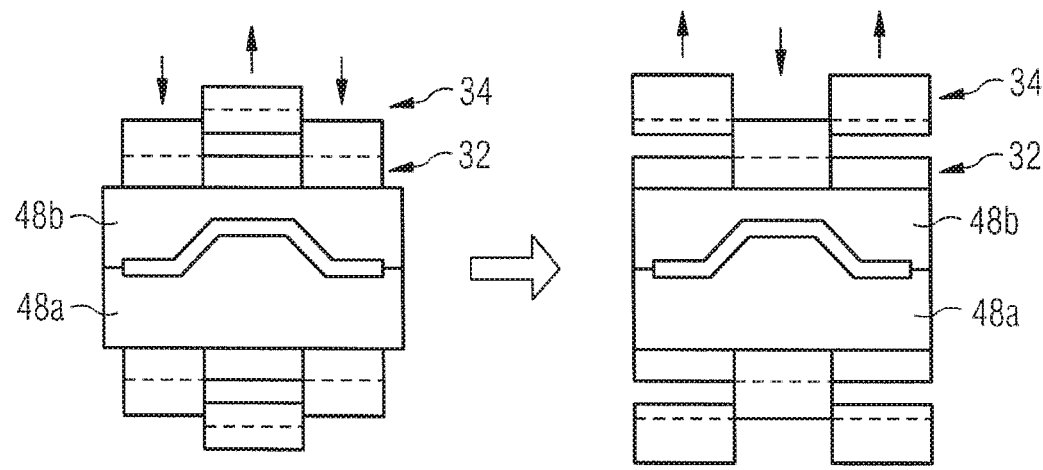

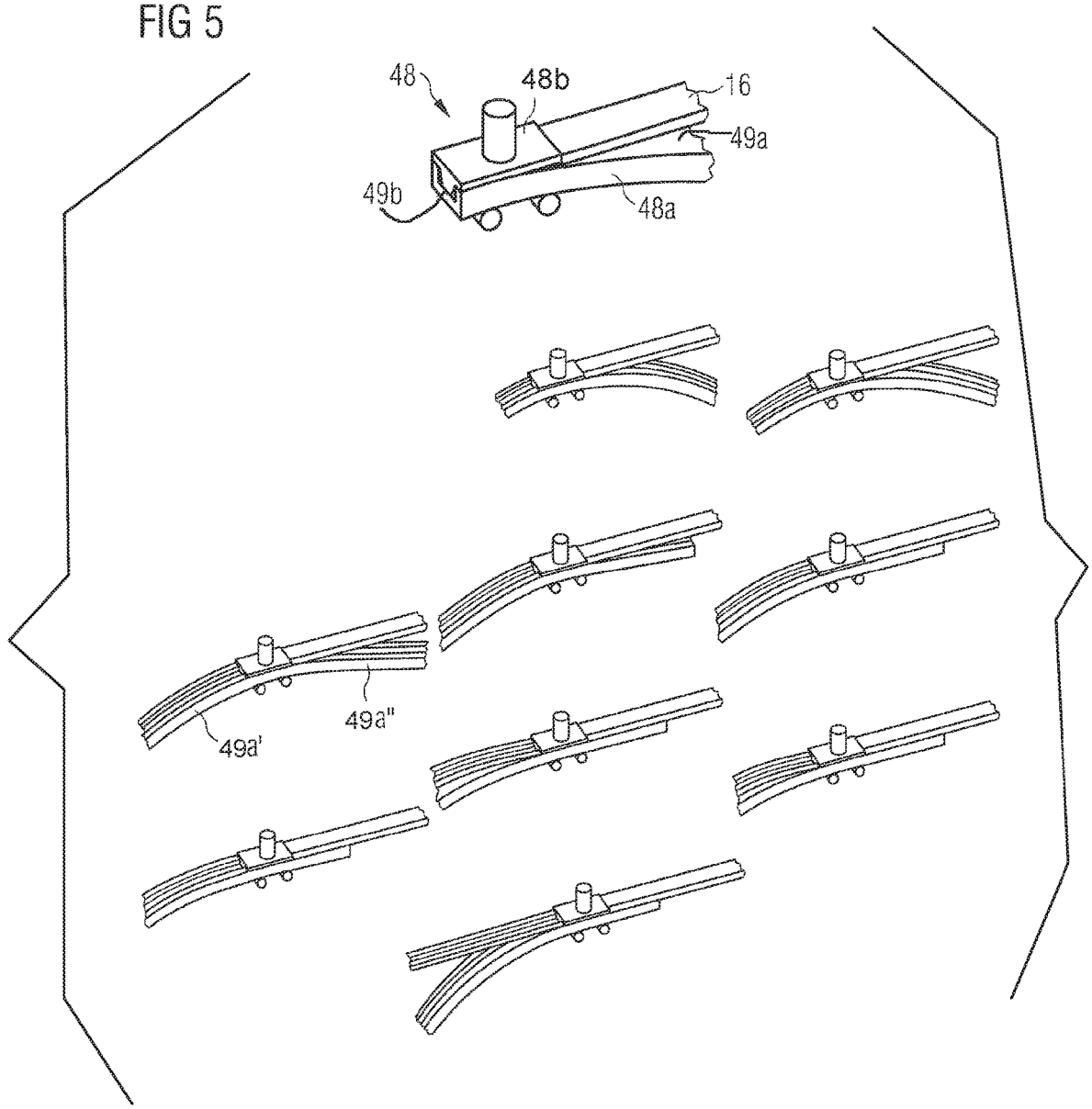

SHAPING TOOL, SHAPING APPARATUS AND METHOD OF FORMING A SEMI-FINISHED PRODUCT CONTAINING REINFORCING FIBERS

CROSS-REFERENCES TO RELATED APPLICATIONS

This application is a continuation of International Application PCT/EP2014/078139 filed Dec. 17, 2014, designating the United States and published on Jun. 25, 2015 as WO 2015/091600. This application also claims the benefit of the German patent application No. 10 2013 226 739.8 filed on Dec. 19, 2013. The entire disclosures of the above are incorporated herein by way of reference.

BACKGROUND OF THE INVENTION

The invention relates to a shaping tool, a shaping apparatus and a method of forming a semi-finished product containing reinforcing fibers in a continuous process. The invention also relates to a device for the continuous production of components, in particular structural components for aircraft, made of fiber-reinforced composite materials.

In aircraft construction, attempts are being made to increasingly use, as load-bearing components, components which consist entirely or partly of fiber-reinforced composite materials, for example carbon fiber-reinforced plastics (CFP's). For example, DE 10 2007 062 111 A1 describes a cross-member structure which consists of carbon fiber-reinforced plastic and which serves to support the individual panels of an aircraft floor system for separating a passenger cabin from a cargo compartment arranged underneath the passenger cabin. It is also known, for example from DE 10 2004 001 078 A1 or CN 100418850, to provide segments of an aircraft fuselage with a skin and also reinforcing elements (for example, frames, stringers, etc.) made of fiber-reinforced composite materials.

In a method of manufacturing structural components for aircraft made of fiber-reinforced composite materials, a multilayer laminate may first of all be built up from fiber prepregs. The fiber prepregs may comprise a woven or nonwoven made of reinforcing fibers which are provided with a surface layer made of an uncured plastic material, for example an epoxy resin material. The building-up of the laminate may take place manually or in an automated manner. The fiber prepregs may then be brought into a desired shape for a surface section which forms the outer skin of an aircraft or for a reinforcing section which forms a frame or stringer. Finally, the plastic material which has been applied to the surfaces of the fibers is cured in an autoclave cycle under pressure and/or elevated temperature, so that a composite material having a matrix made of a cured plastic and reinforcing fibers embedded in the matrix is brought into being. An autoclave process is particularly well suited to the individual production of components having even a complex shape.

In contrast to this, EP 1 819 503 B1 describes a method for the continuous production of structural profiles which are suitable for use as structural components for aircraft. In this method, a multilayer fiber-plies arrangement is produced first of all. For this purpose, dry fiber plies are unwound from suitable rolls and fed to a pre-forming tool which brings the fiber plies into a desired preform under pressure. The pre-formed stack of fiber plies produced in the pre-forming tool is impregnated with a mixture of an epoxy resin and a curing agent, which mixture is brought, by supplying heat, to a partial reaction which brings about an increase in the viscosity of the resin. The resin-impregnated stack of fiber plies is then heated further in a cycle press and subjected to pressure so that the resin gels, that is to say the crosslinking of the resin proceeds until dimensional stability is achieved. Finally, the complete curing of the resin takes place in a tunnel oven.

Throughout the process, the fiber plies, the stack of fiber plies or the resin-impregnated stack of fiber plies are continuously conveyed to, and through, the individual stations of the process by means of suitable take-off devices. The cycle press is movably mounted so that it can be moved, together with the resin-impregnated stack of fiber plies to be pressed, over a specific distance. As soon as the treatment of one section of the resin-impregnated stack of fiber plies in the cycle press has been completed, the cycle press is opened and moved, counter to the direction of movement of the resin-impregnated stack of fiber plies, until it has reached a suitable position in which the cycle press can be closed again for treating another section of the resin-impregnated stack of fiber plies. The continuous method described in EP 1 819 503 B1 is suitable for manufacturing structural profiles with a constant cross-section in large numbers.

SUMMARY OF THE INVENTION

An object of the invention is to provide a shaping tool, a shaping apparatus and a method which make it possible to bring a semi-finished product containing reinforcing fibers into a curved shape. Another object of the invention is to indicate a device which makes possible the continuous production of curved components, in particular structural components for aircraft, made of fiber-reinforced composite materials.

A shaping tool for forming a semi-finished product which contains reinforcing fibers and is fed to the shaping tool in a continuous process comprises a first shaping-tool element and also a second shaping-tool element which is located opposite the first shaping-tool element. The semi-finished product containing reinforcing fibers may be fed to the shaping tool at a constant or varying speed. However, it is also conceivable to convey the semi-finished product containing reinforcing fibers step-wise and/or with conveying pauses in its direction of conveyance, in which case interruptions in conveyance may be used, for example, for subjecting the semi-finished product to pressure and thereby forming it.

The shaping-tool elements have shaping faces which face towards the semi-finished product, at least in certain operating phases of the shaping tool, and which are curved and/or inclined, at least in certain sections, in the direction of conveyance of the semi-finished product, and/or curved and/or inclined in a direction perpendicular to the direction of conveyance of the semi-finished product. The shaping faces of the shaping-tool elements may be rigidly shaped and may consequently always be curved and/or inclined in the direction of conveyance of the semi-finished product, and/or curved and/or inclined in the direction perpendicular to the direction of conveyance of the semi-finished product. As an alternative to this, however, it is also conceivable to equip the shaping tool with shaping-tool elements whose shaping faces are merely temporarily curved and/or inclined in the direction of conveyance of the semi-finished product, and/or curved and/or inclined in the direction perpendicular to the direction of conveyance of the semi-finished product, whereas they have no curvature or inclination in other operating phases of the shaping tool. In addition, or as an alternative to this, a configuration of the shaping-tool elements is conceivable with shaping faces which have at least one section which is curved and/or inclined in the direction of conveyance of the semi-finished product, and/or curved and/or inclined in the direction perpendicular to the direction of conveyance of the semi-finished product, and also another section which is neither inclined nor curved.

The shaping tool is suitable for providing a semi-finished product, which contains reinforcing fibers and which may be fed to the shaping tool, for example in the form of an endless strand, with a complex curved or twisted shape in a continuous process. In particular, the shaping tool is suitable for bringing elongated structural profiles, for example frames, stringers or the like, which can be used as primary structural components in an aircraft, into a desired curved and/or twisted shape. It is thus possible to manufacture even complexly curved and/or twisted components, in particular structural components for aircraft, in large numbers with short production times.

In one embodiment of the shaping tool, the shaping face of at least one of the shaping-tool elements comprises an elastically deformable material. If desired, the shaping faces of both shaping-tool elements may comprise an elastically deformable material. For example, the shaping tool may be designed in the form of an elastically deformable sleeve which receives the semi-finished product. A shaping face comprising an elastically deformable material may, for example, be produced from an elastomer material or be formed by a surface of a flexible container which is filled, for example, with a granular material or a fluid. A shaping face comprising an elastically deformable material can easily be brought temporarily into a curved and/or inclined or twisted shape and is preferably designed in such a way that it distributes pressure applied to the shaping-tool element as evenly as possible.

In one embodiment, the shaping tool may comprise a shaping-tool element with a shaping face made of a rigid material. For manufacturing a shaping face made of a rigid material, use may be made, for example, of a metal such as, for example, steel or aluminum or an aluminum alloy. However, it is also conceivable to use a rigid plastic material for manufacturing the shaping face. A shaping-tool element which comprises a shaping face made of a rigid material can be combined, in a particularly advantageous manner, with a shaping-tool element which comprises a shaping face comprising an elastically deformable material. The shaping face comprising an elastically deformable material can then be adapted in a flexible manner to the curved and/or inclined or twisted shape of the shaping face comprising a rigid material, for example, when the shaping tool is subjected to pressure. In addition, the shaping face comprising an elastically deformable material may then have a shape which substantially corresponds to the shape of the shaping face comprising a rigid material. For example, in a shaping tool in which one of the shaping-tool elements has a shaping face which comprises a rigid material and has the contour of an omega profile, the other shaping-tool element should comprise a shaping face which comprises an elastically deformable material and which likewise has an omega-profile contour.

A shaping face belonging to a shaping-tool element and comprising a rigid material preferably has a plurality of sections which differ with regard to a curvature and/or inclination in the direction of conveyance of the semi-finished product through the shaping tool and/or in the direction perpendicular to the direction of conveyance of the semi-finished product. The shaping-tool element having the shaping face comprising a rigid material and the other shaping-tool element, which preferably has a shaping face comprising an elastically deformable material, may also be movable, relative to one another, in order to bring different sections of the shaping-tool element into contact with the semi-finished product to be formed. The shaping-tool elements can then be moved, relative to one another, in order to bring the shaping face of the one shaping-tool element, which shaping face comprises an elastically deformable material, into coincidence with different sections of the shaping face, which comprises a rigid material, of the other shaping-tool element, and to thereby shape differently, in certain sections, a semi-finished product which is guided between the shaping faces.

The shaping tool may also comprise a heating apparatus which is adapted to heat the semi-finished product which is arranged between the shaping-tool elements, at least in certain sections. Such a configuration of the shaping tool is particularly appropriate if the semi-finished product containing reinforcing fibers comprises a plastic material which forms, in a component which is to be produced from the semi-finished product, a matrix in which the reinforcing fibers are embedded. The reinforcing fibers may be present in the semi-finished product in the form of individual fibers or in the form of a fiber nonwoven or a woven. In addition to reinforcing fibers, the semi-finished product may contain other components which influence the properties of the material, such as, for example, binding threads, impact strength modifiers, binder particles, surface materials, such as peel-ply for example, for subsequent surface activation, or general functional elements, such as electrical or optical lines, for example. The plastic material in question may be a thermoplastic plastic material or a curable plastic material, for example a resin, in particular an epoxy resin. As a result of the supplying of heat by the heating apparatus, the viscosity of the plastic material contained in the semi-finished product can be reduced and the formability of the product thereby improved. As an alternative to this, however, the heating apparatus may also be used for curing, at least partly or else completely, a plastic material which is contained in the semi-finished product. As the heating apparatus, use may be made, for example, of electric resistance heating. As an alternative, or in addition to this, the heating apparatus may comprise fluid ducts through which a heating fluid can flow.

In addition, or as an alternative to this, the shaping tool may also comprise a plastic-feeding apparatus which is adapted to impregnate the semi-finished product arranged between the shaping-tool elements with a plastic material, at least in certain sections. The plastic-feeding apparatus may comprise, for example, an injection duct which is routed through at least one of the shaping-tool elements and through which plastic material can be conducted to the semi-finished product. For example, a pressurizing operation within the shaping tool may be used for forcing air which is enclosed in a dry reinforcing-fiber woven, that is to say one which is not impregnated with a plastic material, out of the reinforcing-fiber woven, and replacing the air by a plastic material which is poured over the reinforcing-fiber woven before the woven is subjected to pressure.

A shaping apparatus for forming a semi-finished product containing reinforcing fibers comprises a shaping tool, which has been described above, and a press having a first pressing element and a second pressing element which is located opposite the first pressing element, the first and second pressing elements being adapted to subject the semi-finished product, which is fed to the shaping tool in a continuous process between the first and second shaping-tool elements, to pressure in a direction perpendicular to a direction of conveyance of the semi-finished product. For pressurizing the semi-finished product, the two pressing elements may be movable, relative to one another. Furthermore, it is also possible, depending upon the geometry of the component to be produced, to make use of a press which exerts pressure on all sides and has one fixed pressing jaw and three movable pressing jaws. The press may comprise a suitable driving apparatus such as, for example, a hydraulic or pneumatic apparatus or an electric driving apparatus with an electric motor and a driving spindle.

The pressing elements preferably have pressing faces which face towards the semi-finished product, at least in certain operating phases of the shaping apparatus, and which are curved and/or inclined, at least in certain sections, in the direction of conveyance of the semi-finished product, and/or curved and/or inclined in a direction perpendicular to the direction of conveyance of the semi-finished product. The pressing faces of the pressing elements may therefore be rigidly shaped and consequently always curved and/or inclined in the direction of conveyance of the semi-finished product, and/or curved and/or inclined in the direction perpendicular to the direction of conveyance of the semi-finished product. As an alternative to this, however, it is also conceivable to equip the press with pressing elements whose pressing faces are merely temporarily curved and/or inclined in the direction of conveyance of the semi-finished product, and/or curved and/or inclined in the direction perpendicular to the direction of conveyance of the semi-finished product while, in other operating phases of the shaping tool, they have no curvature or inclination. In addition, or as an alternative to this, a configuration of the pressing elements is conceivable with pressing faces which have at least one section which is curved and/or inclined in the direction of conveyance of the semi-finished product, and/or curved and/or inclined in the direction perpendicular to the direction of conveyance of the semi-finished product, and also another section which is neither inclined nor curved.

The first and/or the second pressing element may be movably mounted via a plurality of movable mounting elements. The mounting elements may be movable by means of an active driving apparatus in order to bring the pressing face(s) of the first and/or the second pressing element into the desired shape. For example, the first and/or the second pressing element may be mounted via mounting elements which can be brought into a desired position by means of a suitable pneumatic, hydraulic or electric driving apparatus. Basically, the two pressing elements may be mounted via a plurality of movable mounting elements which can be moved by means of an active driving apparatus. As an alternative to this, however, it is also conceivable to provide an active driving apparatus only for mounting elements belonging to one pressing element, and to mount the other pressing element via passive, movable mounting elements which are then moved as well in a suitable manner when the mounting elements connected to an active driving apparatus are brought into a desired position.

The first and/or the second pressing element may comprise a plurality of rollers or pairs of rollers which are arranged one behind another in the direction of conveyance of the semi-finished product. At least some of the rollers may be displaceable in a direction perpendicular to the direction of conveyance of the semi-finished product, in order to impart a desired curvature to the semi-finished product, which is guided between the first and second pressing elements, in its direction of conveyance. In addition, or as an alternative to this, an axis of rotation of the rollers which extends perpendicularly to the direction of conveyance of the semi-finished product and perpendicularly to the direction of displacement of the rollers may be tiltable, relative to the direction of conveyance of the semi-finished product. It is thereby possible to achieve a shape of the semi-finished product which is inclined, relative to its direction of conveyance, or, in combination with a curvature, a twist within the semi-finished product.

The first and/or the second pressing element may be constructed in the form of a conveyor belt. The conveyor belt may be mounted via a plurality of rollers. A pressing element which is constructed in the form of a conveyor belt can be brought into a curved and/or twisted shape temporarily by means of a suitable driving apparatus in a comparatively simple manner.

The semi-finished product may be conveyed by means of a conveying apparatus which can be operated independently of the shaping apparatus. A conveying apparatus of this kind may be constructed, for example, in the form of a toothed-rack drive or comprise a first and a second gripping device. The first and second gripping devices may each be adjustable between an open position, in which they free the semi-finished product, and a closed position, in which they grip the semi-finished product fast between two gripping jaws, and may be movable, in the direction of conveyance or counter to the direction of conveyance of the semi-finished product, between a gripping position and a releasing position. The operation of the first and second gripping devices may be controlled in such a way that the first gripping device is located in its open position and is moved, counter to the direction of conveyance of the semi-finished product, out of its releasing position and into its gripping position, relative to the semi-finished product, when the second gripping device is located in its closed position and is moved in the direction of conveyance of the semi-finished product, together with the semi-finished product, out of its gripping position and into its releasing position. Conversely, the first gripping device may be located in its closed position and be moved in the direction of conveyance of the semi-finished product, together with the semi-finished product, out of its gripping position and into its releasing position, when the second gripping device is located in its open position and is moved, relative to the semi-finished product, counter to the direction of conveyance of the semi-finished product, out of its releasing position and into its gripping position. Consequently, in the case of a conveying apparatus which is constructed in this way, the first and second gripping devices alternately ensure movement of the semi-finished product in the direction of conveyance.

The shaping apparatus may also comprise a fixing apparatus which is adapted to fix the shaping tool in a form-locking manner, at least in certain operating phases of the shaping tool. The fixing apparatus may, for example, comprise a housing comprising a rigid material for receiving a shaping face which comprises an elastically deformable material. The fixing apparatus may also comprise a toothed-rack drive which may then fulfil the double function of, on the one hand, moving the shaping tool, relative to the semi-finished product which is conveyed through it and, on the other hand, fixing the shaping-tool elements in a form-locking manner until they are sufficiently dimensionally stable. The use of a fixing apparatus is particularly advantageous if the shaping-tool elements contain an elastomer material, for example a PTFE material, which has a coefficient of thermal expansion which is not constant and is difficult to monitor. The fixing apparatus may then ensure that the shaping-tool elements are forced into the desired shape until the semi-finished product has the desired shape and also has sufficient dimensional stability, if necessary as a result of suitable (partial) curing of the plastic material contained in the semi-finished product.

The shaping apparatus may also comprise a control apparatus which is adapted to control the shaping-tool elements into a closed position in order to subject a first section of the semi-finished product, which first section is arranged between the shaping-tool elements, to pressure. The control apparatus may also be adapted to move the shaping-tool elements, together with the first section of the semi-finished product, in the direction of conveyance of the semi-finished product, as long as the shaping-tool elements are subjecting the first section of the semi-finished product to pressure. For this purpose, the shaping-tool elements may, for example, be mounted so as to be movable along a guiding apparatus. Finally, the control apparatus may be adapted to control the shaping-tool elements into an open position and move them, relative to the first section of the semi-finished product, counter to the direction of conveyance of the semi-finished product until the shaping-tool elements are arranged in a position in which they can be controlled into a closed position again, in order to subject a second section of the semi-finished product, which second section is arranged behind the first section of the semi-finished product, referred to the direction of conveyance of the semi-finished product, to pressure. In other words, after the subjection of the first section of the semi-finished product to pressure has been terminated, the shaping-tool elements may be moved, relative to the semi-finished product, counter to its direction of conveyance until they can be controlled into their closed position again and, in the process, subject the second section of the semi-finished product to pressure.

A shaping tool which is configured in this way may also serve as part of a conveying apparatus. The shaping tool then forms one of the gripping devices of a conveying apparatus which has been described above and downstream of which, or upstream of which, the other gripping device is incorporated. The shaping tool that forms a gripping device, and the other gripping device, can then be operated as described above in order to convey the semi-finished product containing reinforcing fibers.

The control apparatus may also be adapted to cause a movement of the shaping-tool elements, relative to one another, when the shaping-tool elements are located in their open position. As a result, different sections of the shaping-tool element can be brought into contact with the semi-finished product which is to be formed. For example, shaping-tool elements can be moved, relative to one another, in order to bring a shaping face of one shaping-tool element, which shaping face comprises an elastically deformable material, into coincidence with different sections of a shaping face, which comprises a rigid material, of the other shaping-tool element, and thereby shape differently, in certain sections, a semi-finished product which is guided between the shaping faces.

In a method of forming a semi-finished product containing reinforcing fibers, the semi-finished product is fed to a shaping tool which comprises a first shaping-tool element and also a second shaping-tool element which is located opposite the first shaping-tool element. The semi-finished product is subjected to pressure, in a direction perpendicular to a direction of conveyance of the semi-finished product, by means of a press which comprises a first pressing element and a second pressing element which is located opposite the first pressing element. The semi-finished product is subjected to pressure via shaping faces of the first and second shaping-tool elements, which shaping faces, at least in certain operating phases of the shaping tool, are curved and/or inclined, at least in certain sections, in a direction of conveyance of the semi-finished product through the shaping tool, and/or curved and/or inclined, at least in certain sections, in a direction perpendicular to the direction of conveyance of the semi-finished product.

The pressing elements may have pressing faces which face towards the semi-finished product, at least in certain operating phases of the press, and which are curved and/or inclined, at least in certain sections, in a direction of conveyance of the semi-finished product through the shaping tool, and/or curved or inclined in a direction perpendicular to the direction of conveyance of the semi-finished product.

The first and/or the second pressing element may be mounted via a plurality of movable mounting elements, the mounting elements being moved by means of an active driving apparatus in order to bring the pressing face(s) of the first and/or the second pressing element into the desired shape.

The first and/or the second pressing element may comprise a plurality of rollers which are arranged one behind another in the direction of conveyance of the semi-finished product, at least some of the rollers being displaced in a direction perpendicular to the direction of conveyance of the semi-finished product and/or an axis of rotation of the rollers being tilted, relative to the direction of conveyance of the semi-finished product.

The first and/or the second pressing element may be constructed in the form of a conveyor belt.

The shaping tool may be fixed in a form-locking manner, at least in certain operating phases of the shaping tool, by a fixing apparatus.

A control apparatus may control the operation of the shaping-tool elements in such a way that the shaping-tool elements are controlled into a closed position in order to subject a first section of the semi-finished product, which first section is arranged between the shaping-tool elements, to pressure, the shaping-tool elements are moved, together with the first section of the semi-finished product, in the direction of conveyance of the semi-finished product as long as the shaping-tool elements are subjecting the first section of the semi-finished product to pressure, and the shaping-tool elements are controlled into an open position and moved, relative to the first section of the semi-finished product, counter to the direction of conveyance of the semi-finished product, until the shaping-tool elements are arranged in a position in which they can be controlled into a closed position again, in order to subject a second section of the semi-finished product, which second section is arranged behind the first section of the semi-finished product, referred to the direction of conveyance of the semi-finished product, to pressure.

The control apparatus may also cause a movement of the shaping-tool elements, relative to one another, when the shaping-tool elements are located in their open position. It is also conceivable to heat the semi-finished product arranged behind the shaping-tool elements, at least in certain sections. In addition, the semi-finished product arranged between the shaping-tool elements may be impregnated, at least in certain sections, with a plastic material.

A device for the continuous production of components made of fiber-reinforced composite material comprises a conveying apparatus which is adapted to convey a semi-finished product containing reinforcing fibers through the device. The device also comprises a shaping apparatus which is described above.

BRIEF DESCRIPTION OF THE DRAWINGS

Preferred embodiments of the invention will now be explained in greater detail with reference to the appended diagrammatic drawings, in which:

FIG. 1 shows a general representation of a device for the continuous production of components made of fiber-reinforced composite materials, FIG. 2 shows a first variant of a conveying apparatus which may be used in a device for the continuous production of components made of fiber-reinforced composite materials according to FIG. 1, FIGS. 3A to 3C show an alternative variant of a conveying apparatus which may be used in a device for the continuous production of components made of fiber-reinforced composite materials according to FIG. 1, FIGS. 4A and 4B show, in a side view, a first embodiment of a shaping apparatus which may be used in a device for the continuous production of components made of fiber-reinforced composite materials according to FIG. 1, FIG. 5 shows, in a three-dimensional representations, an alternative embodiment of a shaping apparatus which may be used in a device for the continuous production of components made of fiber-reinforced composite materials according to FIG. 1.

DETAILED DESCRIPTION OF THE PREFERRED EMBODIMENTS

Figure 4A:
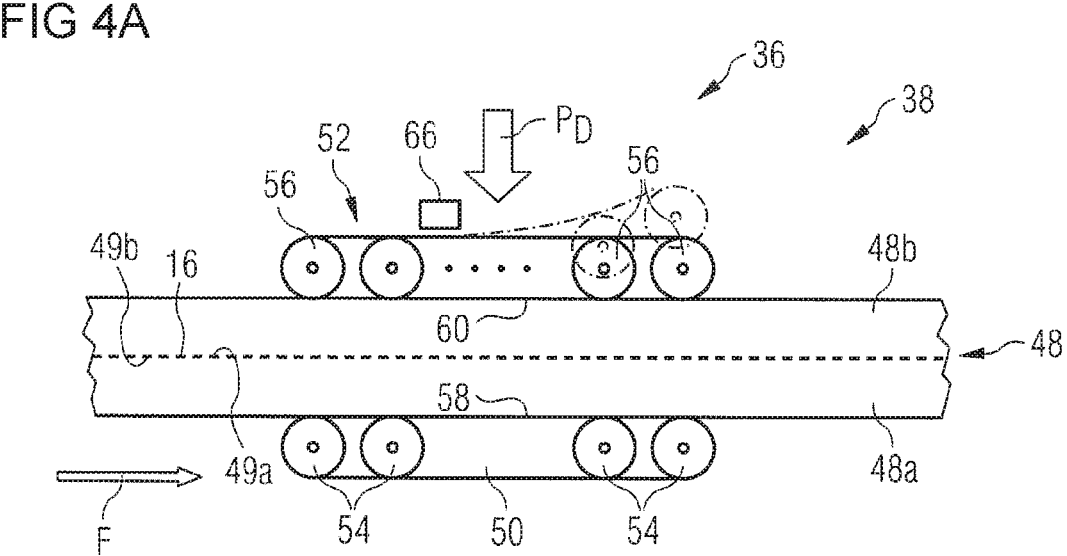

FIG. 1 shows a device 10 for the continuous production of components 12 made of fiber-reinforced composite materials. The device 10 comprises a feeding apparatus 14 for feeding in a semi-finished product 16 containing a reinforcing-fiber material. In particular, the feeding apparatus 14 comprises a plurality of rollers 18, onto each of which an endless strand of a reinforcing-fiber material is wound. The reinforcing-fiber material in question is a dry reinforcing-fiber woven, the reinforcing fibers of which are not saturated with a plastic material. The reinforcing-fiber wovens wound onto the individual rollers 18 may differ from one another with regard to the nature and orientation of the reinforcing fibers contained in the woven. In particular, the reinforcing fibers in the individual reinforcing-fiber wovens may be oriented in a unidirectional or bidirectional manner or in any desired manner.

The plies of reinforcing-fiber woven unwound from the rollers 18 are stacked one above another in a sequence which depends, for example, upon the desired mechanical properties of the component 12 to be manufactured. In particular, reinforcing-fiber wovens with different fiber orientations may be stacked one above another in order to selectively control the mechanical properties of the component 12 to be produced. The rollers 18 of the feeding apparatus 14 may comprise an orientating device (not shown in FIG. 1) for orientating the rollers along their axes of rotation. The orientating device may comprise a detecting apparatus constructed, for example, in the form of a light barrier or the like, which preferably continuously detects a position, on the roller 18, of the reinforcing-fiber woven which is wound onto the roller 18. Depending upon the measurement results supplied by the detecting apparatus, a suitable control apparatus may then ensure displacement of the position of the rollers 18 along their axis of rotation, so that the plies of reinforcing-fiber woven unwound from the rollers 18 can be arranged one above another in a precise manner when they are unwound from the rollers 18. The rollers 18 may, for example, be displaced along their axis of rotation by means of an electric motor and a spindle drive. By configuring the feeding apparatus 14 in this way, it is possible to prevent, or at least significantly reduce, the formation of creases in the individual plies of reinforcing-fiber woven.

The feeding apparatus may also comprise a guiding and/or smoothing device (not shown in FIG. 1) which comprises rollers or sliding shoes and which guides and smooths the plies of reinforcing-fiber woven unwound from the individual rollers of the feeding apparatus when stacking them one above another. If desired, it is possible to also provide a heating apparatus (likewise not shown in FIG. 1) which serves to activate a binder, for example a thermoplastic binder, contained in the plies of reinforcing-fiber woven, in order to join the plies of reinforcing-fiber woven, which are stacked one above another, to one another. The heating apparatus may, for example, comprise a heat source constructed as an infrared radiator or some other suitable heat source.

The plies of reinforcing-fiber woven unwound from the rollers 18 are stacked one above another in a sequence which depends, for example, upon the desired mechanical properties of the component 12 to be manufactured. The stack of plies of reinforcing woven is then fed to a pre-forming apparatus 20. The pre-forming apparatus 20 comprises a pre-forming tool, of which no further details are illustrated in FIG. 1 and in which there is constructed a cavity through which the stack of plies of reinforcing-fiber woven can be passed. The cavity has a cross-section which varies along a direction of conveyance F of the stack of plies of reinforcing-fiber woven through the pre-forming apparatus 20. In particular, the cavity has, in the region of an inlet to the pre-forming tool, a shallow cross-section which substantially corresponds to the shape of the stack of plies of reinforcing-fiber woven. In the region of an outlet, on the other hand, the cavity constructed in the pre-forming tool has a cross-section which already approximates to a cross-section of a component 12 which is to be manufactured from the semi-finished product 16.

After passing through the pre-forming apparatus 20, the semi-finished product 16 is fed to an impregnating apparatus 22. In the impregnating apparatus 22, the reinforcing fibers of the reinforcing-fiber woven are impregnated with a plastic material, in particular a curable plastic material, such as a resin, for example. The impregnating apparatus 22 may comprise an impregnating bath through which the stack of reinforcing-fiber woven is drawn. As an alternative to this, however, the impregnating apparatus 22 may also comprise an impregnating shaping tool into which the plastic material can be injected at a specific pressure. If an impregnating shaping tool is used in the impregnating apparatus 22, the impregnating shaping tool is preferably provided with a cavity, the shape of which already substantially corresponds to the desired shape of a component 12 which is to be produced. As will be explained in still greater detail later, however, it is also possible to integrate the impregnating step into a shaping step for forming the semi-finished product 16.

The semi-finished product 16 is conveyed through the device 10 by means of a conveying apparatus 24. The conveying apparatus 24, which is illustrated in greater detail in FIG. 2, comprises a first and a second gripping device 26, 28, which can each be adjusted between an open position, in which they free the semi-finished product 16, and a closed position, in which they grip the semi-finished product 16 fast between two gripping jaws 26a, 26b, 28a, 28b. The gripping devices 26, 28 can also be moved through the device 10, as indicated by the arrows PK1, Pk2 in FIG. 2, in a direction of conveyance F of the reinforcing-fiber material 16 or counter to the direction of conveyance of the semi-finished product 16, between a gripping position and a releasing position.

The operation of the conveying apparatus 24 is controlled, just like the operation of the other components of the device 10, by means of a central electronic control apparatus 30. As an alternative to the central control apparatus 30, however, use may also be made of a number of separate control apparatuses. The control apparatus 30 controls the operation of the two gripping devices 26, 28 in such a way that the first gripping device 26 is located in its open position and is moved, relative to the semi-finished product 16, counter to the direction of conveyance of the semi-finished product 16, out of its releasing position and into its gripping position when the second gripping device 28 is located in its closed position and is moved, in the direction of conveyance F of the semi-finished product 16, out of its gripping position and into its releasing position, together with the semi-finished product 16.

Conversely, the first gripping device 26 is located in its closed position and is moved, together with the reinforcing-fiber material 16, out of its gripping position and into its releasing position in the direction of conveyance F of the semi-finished product 16, when the second gripping device 28 is located in its open position and is moved, relative to the semi-finished product 16, counter to the direction of conveyance F of the semi-finished product 16, out of its releasing position and into its gripping position. This oppositely directed operation of the two gripping devices 26, 28 is also illustrated in the diagrammatic chart in FIG. 2.

As an alternative to the variant of a conveying apparatus 24 illustrated in FIG. 2, the conveying apparatus 24 may also be constructed in a manner integrated with a shaping apparatus 36 to which the reinforcing-fiber material, which has been impregnated with a curable plastic material in the impregnating apparatus 22, is fed by means of the conveying apparatus 24. In the shaping apparatus 36, the reinforcing-fiber material 16 impregnated with a curable plastic material is brought into a desired shape, as will be explained in still greater detail below.

If desired, the device 10 may also comprise a pre-heating apparatus (not shown in FIG. 1) which serves to pre-heat the semi-finished product 16 impregnated with a plastic material, before it is fed to the shaping apparatus 36. The operation of the pre-heating device is preferably controlled in such a way that the viscosity of an impregnating material comprising a curable plastic material is increased, but there are still no substantial cross-linking reactions taking place in the curable plastic material. The pre-heating apparatus may comprise, for example, a convection-tunnel oven, a device for irradiating the reinforcing-fiber woven impregnated with a plastic material with electron beams, or an infrared radiator.

The device 10 also comprises a curing apparatus 44 which serves to partly or completely cure the curable plastic material with which the reinforcing-fiber material is impregnated. The curing apparatus 44 may comprise, for example, a tunnel oven, an infrared radiator, a heating device that works inductively or a microwave-type heating device. The operation of the curing apparatus 44, that is to say the operation of a heating apparatus belonging to the curing apparatus 44, is preferably controlled by the control apparatus 30 in such a way that the curable plastic material with which the reinforcing-fiber material is impregnated is completely cured by the supplying of heat from the heating apparatus. If desired, however, it is also possible for only a partial curing of the plastic material to take place in the curing apparatus 44.

Finally, there is a cutting device 46 which cuts the semi-finished product 16 discharged from the curing apparatus 44 to a desired length in order to finally produce the components 12. The cutting device 46 may, for example, comprise a band saw which is mounted in a movable manner, so that it can be moved, together with the semi-finished product 16 to be cut, through the device 10 in the direction of conveyance F of the semi-finished product 16, in order to produce a cut which extends perpendicularly to the direction of conveyance F. The cutting device 46 may also comprise a guiding and/or holding apparatus (not shown in FIG. 1) which may be arranged upstream or downstream of the saw, referred to the direction of conveyance F of the semi-finished product 16, and may serve to avoid undesired displacements of the semi-finished product or vibrations in the semi-finished product 16. The position of the guiding and/or holding apparatus may be controlled by means of a control apparatus 30 in dependence upon a varying shape of the semi-finished product 16 which is to be cut.

As an alternative to the variant of a conveying apparatus 24 illustrated in FIG. 2, the conveying apparatus 24 may also comprise two mutually opposed conveyor belts or, as represented in FIG. 3, a toothed-rack drive with two mutually opposed toothed racks 32, 34. The toothed racks 32, 34 can be adjusted, in a manner similar to the gripping devices 26, 28 of the conveying apparatus 24 shown in FIG. 2, between an open position, in which they are not in contact with one another, and an engaging position, in which they are in engagement with one another. A first toothed rack 32 can also be moved, as indicated by the arrow Pz in FIG. 3A, through the device 10 in a direction of conveyance F of the reinforcing-fiber material 16 or counter to the direction of conveyance F of the reinforcing-fiber material 16, between an engaging position (FIG. 3B) and a releasing position (FIG. 3C). The operation of the toothed-rack drive takes place as has been described above with regard to the gripping devices 26, 28 of the conveying apparatus 24 shown in FIG. 2.

Figure 4B:
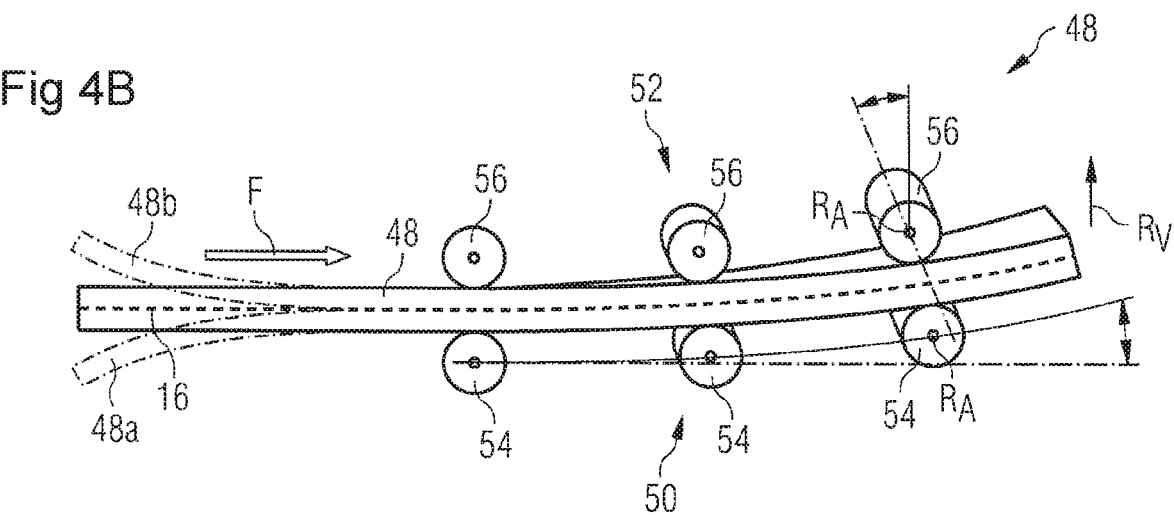

FIGS. 4A, 4B and 5 show various embodiments of a shaping apparatus 36 which may be used in the device 10. The shaping apparatus 36 illustrated in FIGS. 4A and 4B comprises a shaping tool 48 which has a first shaping-tool element 48a and also a second shaping-tool element 48b which is located opposite the first shaping-tool element 48a. The two shaping-tool elements 48a, 48b each comprising an elastically deformable material, for example PTFE, and consequently have shaping faces 49a, 49b which face towards the semi-finished product 16 and which likewise comprise an elastically deformable material. A press 38, which comprises a first pressing element 50 and also a second pressing element 52 which is located opposite the first pressing element 50, serves to subject the semi-finished product 16, which is arranged between the first and second shaping-tool elements 48a, 48b, to pressure in a direction perpendicular to a direction of conveyance F of the semi-finished product, see arrow PD in FIG. 4A. For this purpose, the press 38 comprises a suitable driving apparatus (not shown in the Figures). The pressing elements 50, 52 of the press 38 are each constructed in the form of a conveyor belt.

The conveyor belts which form the first and pressing elements 50, 52 can be moved in opposite directions and exert a gripping force on the shaping tool 48 arranged between the conveyor belts, such that the shaping tool 48 can be moved in the direction of conveyance F of the semi-finished product 16 or counter to the direction of conveyance F of the semi-finished product 16 as a result of the conveying movement of the conveyor belts.

The first pressing element 50 comprises a number of rollers 54 which are arranged one behind another in the direction of conveyance F of the semi-finished product 16. Accordingly, the second pressing element 50 likewise comprises a number of rollers 56 which are arranged one behind another in the direction of conveyance F of the semi-finished product 16, the rollers 54, 56 of the pressing elements 50, 52 being positioned opposite one another in each case. The rollers 54, 56 can be displaced, in a direction perpendicular to the direction of conveyance F of the semi-finished product 16, in the direction of an arrow Pv in FIGS. 4A and 4B, and thereby form movable mounting elements for the first and second pressing elements 50, 52.

As is illustrated, in particular, in FIG. 4B, the rollers 54 of the first pressing element 50 can be displaced, by means of an active driving apparatus (not shown in the Figures) which is constructed, for example, in the form of a hydraulic apparatus, in a direction perpendicular to the direction of conveyance F of the semi-finished product 16, that is to say in the direction of the arrow Pv in FIGS. 4A and 4B. The movably mounted rollers 56 of the second pressing element 52 are entrained when a movement of the rollers 54 of the first shaping-tool element 50 occurs, and are likewise displaced in a direction perpendicular to the direction of conveyance F of the semi-finished product 16, that is to say, in the direction of the arrow Pv in FIGS. 4A and 4B. Axes of rotation RA of the rollers 54 of the first pressing element 50 can also be actively tilted by an angle of, for example, 10°, relative to the direction of conveyance F of the semi-finished product 16, by means of the active driving apparatus, while the rollers 56 of the second pressing element 52 once again follow this tilting movement passively.

It is thereby possible for a first pressing face 58 belonging to the first pressing element 50 and facing towards the semi-finished product 16 to be curved temporarily in the direction of conveyance F of the semi-finished product 16, and also to be curved, that is to say twisted, with regard to the direction of the pressing force applied to the semi-finished product. A second pressing face 60, which is constructed on the second pressing element 52 and faces towards the semi-finished product 16, assumes a corresponding curved and twisted shape. This deformation of the pressing faces 58, 60 of the pressing elements 50, 52 is transferred, because the shaping-tool elements 48, 50 are configured from an elastically deformable material, to the shaping-tool elements 48, 50, so that those shaping faces 49a, 49b of the shaping-tool elements 48a, 48b which face towards the semi-finished product 16 are likewise temporarily curved in the direction of conveyance F of the semi-finished product 16 and also curved, that is to say twisted, with regard to the direction of the pressing force which is applied to the semi-finished product. This shape of the shaping faces 49a, 49b of the shaping-tool elements 48a, 48b is then accordingly transferred to the semi-finished product 16.

The shaping tool 48 also comprises a heating apparatus 66 which may be designed, for example, as electric resistance heating and which serves to heat the semi-finished product 16 arranged between the shaping-tool elements 50, 52, at least in certain sections. As a result of the supplying of heat by the heating apparatus 66, the viscosity of the plastic material contained in the semi-finished product 16 can be reduced and the formability of the semi-finished product 16 thereby improved. Furthermore, the heating apparatus 66 may also be used for curing, at least partly or else completely, the plastic material contained in the semi-finished product 16.

In an alternative embodiment of a shaping apparatus 36 which is shown in various positions in FIG. 5, the first shaping-tool element 48a of the shaping tool 48 comprises a rigid material, whereas the second shaping-tool element 48b comprises an elastically deformable material. The first shaping-tool element 48a may, for example, comprise metal, such as, for example, steel or aluminum or an aluminum alloy. The second shaping-tool element 48b, which comprises an elastically deformable material, may, for example, be produced from an elastomer material or be formed by a flexible container which is filled, for example, with a granular material or a fluid. The shape of the shaping face 49b of the second shaping-tool element 48b that comprises an elastically deformable material can then be adapted, as shown in FIG. 5, to the curved or twisted shape of the shaping face 49a of the first shaping-tool element 48 that comprises a rigid material, when the semi-finished product 16 arranged between the shaping-tool elements 48a, 48b is subjected to pressure by means of a press, of which no further details are illustrated.

The shaping face 49a of the shaping-tool element 48a, which face comprises a rigid material, has a first section 49a' which differs from a second section 49a" of the shaping face 49a with regard to a curvature in the direction of conveyance F of the semi-finished product 16 through the shaping tool 48. In particular, the first section 49a' of the shaping face 49a is curved in the direction of conveyance F of the semi-finished product 16, whereas the second section 49a" of the shaping face 49a has no curvature. The shaping-tool element 48a having the shaping face 49a that comprises a rigid material and the shaping-tool element 48b having the shaping face 49b that comprises an elastically deformable material can be moved, relative to one another, in order to bring different sections of the shaping-tool element 48a, that is to say the different sections 49a', 49a" of the shaping face 49a of the shaping-tool element 48a, into contact, as required, with the semi-finished product 16 which is to be formed.

By means of the control apparatus 30, the operation of the shaping tool 48 is controlled in such a way that the shaping-tool elements 48a, 48b are controlled into a closed position in order to subject a first section of the semi-finished product 16, which first section is arranged between the shaping-tool elements 48a, 48b, to pressure. The control apparatus 30 also controls the operation of the shaping tool 48 in such a way that the shaping-tool elements 48a, 48b are moved, together with the first section of the semi-finished product 16, in the direction of conveyance F of the semi-finished product 16, as long as the shaping-tool elements 48a, 48b are subjecting the first section of the semi-finished product 16 to pressure. For this purpose, the shaping-tool elements 48a, 48b are mounted so as to be movable along a guiding apparatus, which is not shown. Finally, the shaping-tool elements 48a, 48b are guided by the control apparatus 30 into an open position and are moved, relative to the first section of the semi-finished product 16, counter to the direction of conveyance F of the semi-finished product 16 until the shaping-tool elements 48a, 48b are arranged in a position in which they can be controlled into a closed position again, in order to subject a second section of the semi-finished product 16, which second section is arranged behind the first section of the semi-finished product 16, referred to the direction of conveyance of the semi-finished product 16, to pressure.

A shaping tool 48 which is configured in this way may also serve as part of a conveying apparatus 24. The shaping tool 48 then forms one of the gripping devices 26, 28 of a conveying apparatus 24, which has been described above and downstream of which, or upstream of which, the other gripping device 28, 26 is incorporated. The shaping tool 48 that forms one gripping device 26, 28, and the other gripping device 28, 26 can then be operated, as described above, in order to convey the semi-finished product 16 through the device 10.

In addition, the control apparatus 30 causes, if necessary, a movement of the shaping-tool elements 48a, 48b relative to one another, when the shaping-tool elements 48a, 48b are located in their open position, in order to bring the different sections of the shaping-tool element 48a into contact with the semi-finished product 16 which is to be formed. This is illustrated in FIG. 5, in which, in the first representation of the shaping apparatus 36 at the top left, a left-hand end of the shaping-tool element 48a is in contact with the semi-finished product 16 which is to be formed, while in the other representations, sections of the shaping-tool element 48a for forming the semi-finished product 16 which are located further to the right are used in order to shape the semi-finished product differently in certain sections.

Figure 6:
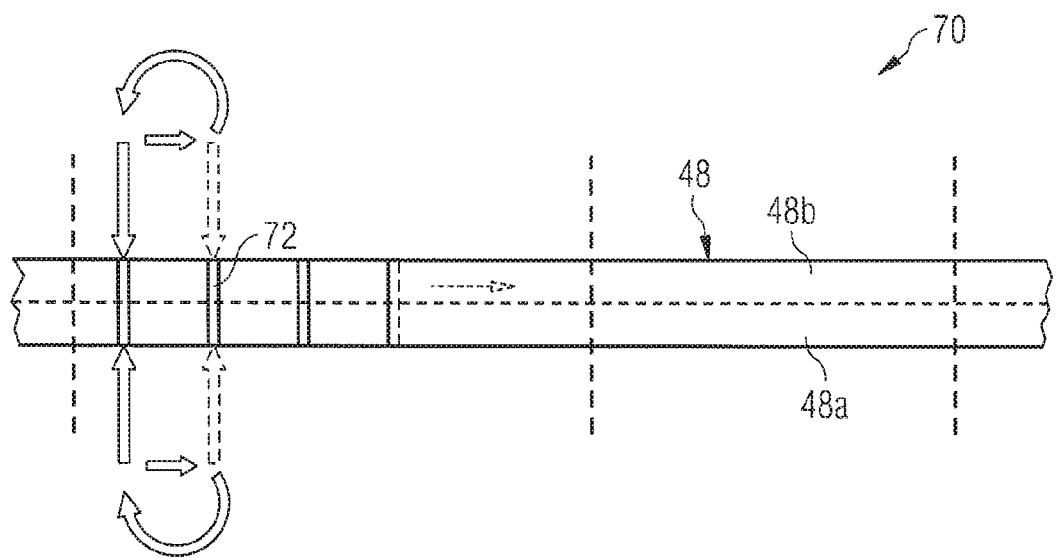
FIG. 6 shows a shaping tool which may be used in a shaping apparatus according to FIG. 4A, 4B or 5 and makes it possible to integrate an impregnating step into a shaping step.

The shaping tools 48 shown in FIGS. 4A, 4B and 5 may comprise a plastic-feeding apparatus 70 which is adapted to impregnate the semi-finished product 16 arranged between the shaping-tool elements 48a, 48b with a plastic material, see FIG. 6. The plastic-feeding apparatus 70 comprises a plurality of injection ducts 72 which are routed through the shaping-tool elements 48a, 48b and through which plastic material can be conducted to the semi-finished product 16. The pressurizing operation within the shaping tool 48 may be used for forcing air which is enclosed in a dry reinforcing-fiber woven, out of the woven, and replacing the air by a plastic material which is conducted through the injection ducts 72 into the reinforcing-fiber woven before the woven is subjected to pressure.

Figure 7:
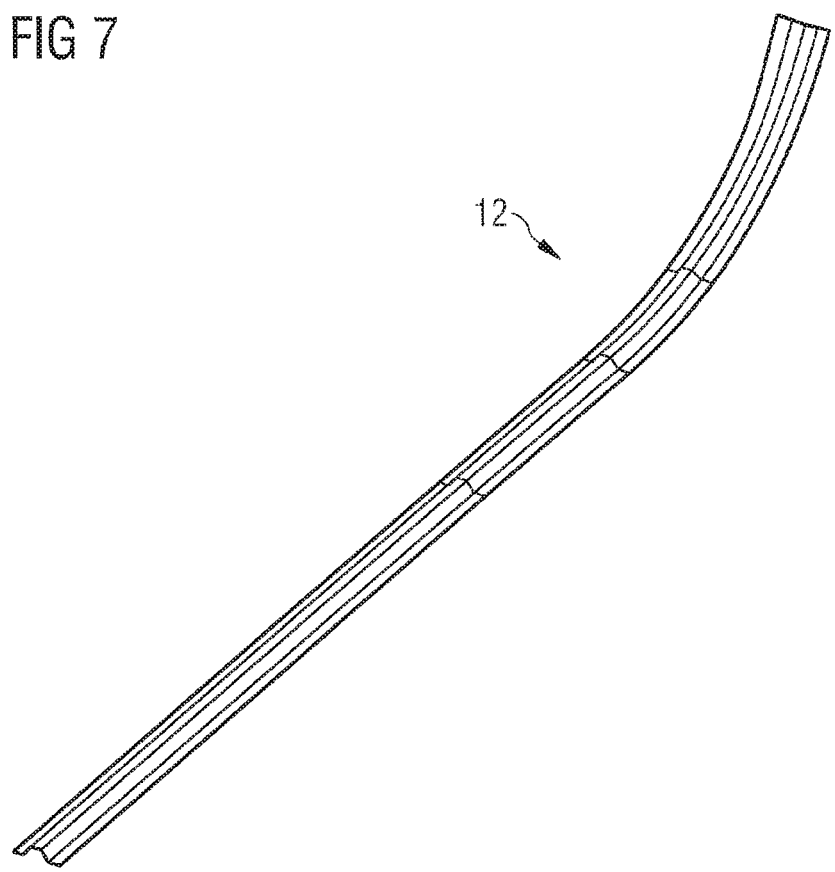
FIG. 7 shows an example of a component which may be manufactured by means of a shaping apparatus according to FIG. 4A, 4B or 5 in a continuous production method.

By means of a shaping tool 48, the semi-finished product 16 containing reinforcing fibers can be provided, in a continuous process, with a complex curved or twisted shape, for example in order to manufacture a structural component 12 for an aircraft, which component is shown in FIG. 7.

If desired, the shaping apparatus 36 may also comprise a fixing apparatus which is adapted to fix the shaping tool in a form-locking manner, at least in certain operating phases of the shaping tool. The fixing apparatus may, for example, comprise a housing comprising a rigid material for receiving a shaping-tool element 48a, 48b which comprises an elastically deformable material. The fixing apparatus may also comprise a toothed-rack drive which is illustrated in FIGS. 3A to 3C and which may then fulfil the double function of, on the one hand, moving the shaping tool relative to the semi-finished product which is conveyed through the tool, and on the other hand, fixing the shaping-tool elements 48a, 48b in a form-locking manner until they have sufficient dimensional stability.

Although various features of the invention have been described here with reference to specific forms of embodiment of the invention, these features can be combined with one another in any desired manner.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A shaping tool for forming a semi-finished product which contains reinforcing fibers and is fed to said shaping tool in a continuous process, the shaping tool comprising:
    a first shaping-tool element; and,
    a second shaping-tool element which is located opposite said first shaping-tool element,
    the shaping-tool elements having shaping faces which face towards the semi-finished product, and which are at least one of curved and inclined, at least in certain sections, in at least one of
        a direction of conveyance of said semi-finished product through the shaping tool, and
        a direction perpendicular to said direction of conveyance of said semi-finished product, and
    wherein the first and second shaping-tool elements contact each other with said semi-finished product between the first and second shaping-tool elements,
    wherein the shaping face of at least one of the shaping-tool elements comprises an elastically deformable material.

2. The shaping tool according to claim 1, wherein the shaping face of one of the shaping-tool elements comprises a rigid material.

3. The shaping tool according to claim 2,
    wherein the shaping face of the shaping tool-element, which comprises a rigid material, has a plurality of sections which differ with regard to at least one of a curvature and inclination in at least one of the direction of conveyance of the semi-finished product through the shaping tool and in the direction perpendicular to said direction of conveyance of said semi-finished product, and
    wherein the shaping-tool element having the shaping face comprising a rigid material, and the other shaping-tool element, are configured to be movable, relative to one another, in order to bring different sections of the two shaping-tool elements into contact with the semi-finished product to be formed.

4. The shaping tool according to claim 1, further comprising at least one of:
    a heating apparatus adapted to heat the semi-finished product which is arranged between the shaping-tool elements, at least in certain sections, and a plastic-feeding apparatus adapted to impregnate the semi-finished product arranged between the shaping-tool elements with a plastic material, at least in certain sections.

5. A shaping apparatus for forming a semi-finished product containing reinforcing fibers, which apparatus comprises:
a shaping tool for forming a semi-finished product which contains reinforcing fibers and is fed to said shaping tool in a continuous process, the shaping tool comprising:
a first shaping-tool element and
a second shaping-tool element which is located opposite said first shaping-tool element,
the shaping-tool elements having shaping faces which face towards the semi-finished product, and which are at least one of curved and inclined, at least in certain sections, in at least one of
a direction of conveyance of said semi-finished product through the shaping tool, and
a direction perpendicular to said direction of conveyance of said semi-finished product, and
a press having a first pressing element and a second pressing element which is located opposite said first pressing element, said first and second pressing elements being adapted to subject the semi-finished product, which is fed to the shaping tool in a continuous process between the first and second shaping-tool elements, to pressure in a direction perpendicular to a direction of conveyance of said semi-finished product,
wherein the first and second shaping-tool elements contact each other with said semi-finished product between the first and second shaping-tool elements.

6. The shaping apparatus according to claim 5, wherein the pressing elements have pressing faces which face towards the semi-finished product, and which are, at least in certain sections, at least one of curved and inclined in at least one of a direction of conveyance of the semi-finished product through the shaping tool and in a direction perpendicular to said direction of conveyance of said semi-finished product.

7. The shaping apparatus according to claim 6, wherein at least one of the first and the second pressing element is movably mounted via a plurality of movable mounting elements, said mounting elements being movable by means of an active driving apparatus in order to bring a pressing face of at least one of the first and the second pressing element into the desired shape.

8. The shaping apparatus according to claim 5, wherein at least one of the first and the second pressing element comprises a plurality of rollers, which are arranged one behind another in the direction of conveyance of the semi-finished product, at least some of the rollers being displaceable in a direction perpendicular to said direction of conveyance of said semi-finished product.

9. The shaping apparatus according to claim 8, an axis of rotation of the rollers being tiltable, relative to said direction of conveyance of said semi-finished product.

10. The shaping apparatus according to claim 5, wherein at least one of the first pressing element and the second pressing element is constructed in the form of a conveyor belt.

11. The shaping apparatus according to claim 5, further comprising a fixing apparatus adapted to fix the shaping tool in a form-locking manner.

12. The shaping apparatus according to claim 5, further comprising a control apparatus adapted to:
control the shaping-tool elements into a closed position in order to subject a first section of the semi-finished product, which is arranged between said shaping-tool elements, to pressure,
move the shaping-tool elements, together with the first section of the semi-finished product, in the direction of conveyance of said semi-finished product, as long as the shaping-tool elements are subjecting said first section of said semi-finished product to pressure, and
control the shaping-tool elements into an open position and move them, relative to the first section of the semi-finished product, counter to the direction of conveyance of said semi-finished product until said shaping-tool elements are arranged in a position in which they can be controlled into a closed position again, in order to subject a second section of the semi-finished product, which is arranged behind the first section of said semi-finished product, referred to the direction of conveyance of said semi-finished product, to pressure.

13. The shaping apparatus according to claim 12, wherein the control apparatus is further adapted to cause a movement of the shaping-tool elements, relative to one another, when said shaping-tool elements are located in their open position.

14. A device for the continuous production of components made of fiber-reinforced composite materials, said device having:
a conveying apparatus which is adapted to convey a semi-finished product containing reinforcing fibers through said device, and
a shaping apparatus according to claim 5.

15. A method of forming a semi-finished product containing reinforcing fibers, said method comprising the steps:
feeding the semi-finished product to a shaping tool which comprises a first shaping-tool element and a second shaping-tool element which is located opposite said first shaping-tool element,
subjecting the semi-finished product to pressure, in a direction perpendicular to a direction of conveyance of said semi-finished product, by means of a press which comprises a first pressing element and a second pressing element which is located opposite said first pressing element,
wherein the semi-finished product is subjected to pressure via shaping faces of said first and second shaping-tool elements, which are at least one of curved and inclined, at least in certain sections, in at least one of a direction of conveyance of the semi-finished product through the shaping tool and in a direction perpendicular to said direction of conveyance of said semi-finished product, and
wherein the first and second shaping-tool elements contact each other with said semi-finished product between the first and second shaping-tool elements.

16. The method according to claim 15, wherein at least one of
the pressing elements have pressing faces which face towards the semi-finished product and which are at least one of curved and inclined, at least in certain sections, in at least one of a direction of conveyance of said semi-finished product through the shaping tool and in a direction perpendicular to said direction of conveyance of said semi-finished product,
at least one of the first pressing element and the second pressing element is mounted via a plurality of movable mounting elements, said mounting elements being moved by means of an active driving apparatus in order to bring the pressing face of the at least one of the first and second pressing element into the desired shape, at least one of the first and the second pressing element comprises a plurality of rollers which are arranged one behind another in the direction of conveyance of the semi-finished product, wherein at least one of at least some of the rollers being displaced in a direction perpendicular to the direction of conveyance of said semi-finished product, and an axis of rotation of the rollers being tilted, relative to the direction of conveyance of said semi-finished product, and at least one of the first pressing element and the second pressing element is constructed in the form of a conveyor belt.

17. The method according to claim 15, wherein the shaping tool is fixed in a form-locking manner by a fixing apparatus.

18. The method according to claim 15, wherein a control apparatus controls the operation of the shaping-tool elements in such a way that said shaping-tool elements are controlled into a closed position in order to subject a first section of the semi-finished product, which first section is arranged between the shaping-tool elements, to pressure, the shaping-tool elements are moved, together with the first section of the semi-finished product, in the direction of conveyance of said semi-finished product as long as the shaping-tool elements are subjecting said first section of said semi-finished product to pressure, and the shaping-tool elements are controlled into an open position and moved, relative to the first section of the semi-finished product, counter to the direction of conveyance of said semi-finished product, until said shaping-tool elements are arranged in a position in which they can be controlled into a closed position again, in order to subject a second section of said semi-finished product, which second section is arranged behind the first section of said semi-finished product, referred to the direction of conveyance of said semi-finished product, to pressure.

19. The method according to claim 18, wherein at least one of the control apparatus also causes a movement of the shaping-tool elements relative to one another, when said shaping-tool elements are located in their open position, the semi-finished product arranged between the shaping-tool elements is heated, at least in certain sections, and the semi-finished product arranged between the shaping-tool elements is impregnated with a plastic material, at least in certain sections.

* * * * *